United States Patent [19]

Miura et al.

[11] 4,158,835
[45] Jun. 19, 1979

[54] ARRANGEMENT FOR DETECTING A WINDOW AREA OF A WINDOW-HAVING MAIL ITEM

[75] Inventors: Tetsuo Miura; Yasuo Nishijima, both of Tokyo, Japan

[73] Assignee: Nippon Electric Co., Ltd., Tokyo, Japan

[21] Appl. No.: 851,655

[22] Filed: Nov. 15, 1977

[30] Foreign Application Priority Data

Nov. 16, 1976 [JP] Japan .................................. 51-138184

[51] Int. Cl.² .............................................. G06K 9/04
[52] U.S. Cl. .............................. 340/146.3 H; 209/900
[58] Field of Search ................................ 340/146.3 H; 209/DIG. 1

[56] References Cited

U.S. PATENT DOCUMENTS

| 3,846,753 | 11/1974 | Spanjersberg | 340/146.3 H |
| 4,013,999 | 3/1977 | Erwin et al. | 340/146.3 H |
| 4,034,341 | 7/1977 | Isono et al. | 340/146.3 H |

FOREIGN PATENT DOCUMENTS

| 1126574 | 9/1968 | United Kingdom | 340/146.3 H |
| 1126603 | 9/1968 | United Kingdom | 340/146.3 H |

Primary Examiner—Leo H. Boudreau
Attorney, Agent, or Firm—Sughrue, Rothwell, Mion, Zinn and Macpeak

[57] ABSTRACT

An arrangement for detecting a window area of a window-having mail item is for use in combination with a device of the type disclosed in U.S. Pat. No. 4,034,341 for detecting addressee's addresses described on the mail items successively fed thereto by determining information positions of the respective postal information pieces including the addressee's names and addresses, senders' names and addresses, and so forth. Responsive to a point signal produced by the device to determine a point on each mail item and to the light incident on the window area from the device and approximately regularly reflected therefrom to be sensed by an optical sensor of the arrangement, a window position detector of the arrangement produces a window position signal representative of the window position relative to the window-having mail item. From information positions produced by the device for all postal information pieces, selection is made with reference to the window position signal of the information positions visible through the window area.

4 Claims, 8 Drawing Figures

ARRANGEMENT FOR DETECTING A WINDOW AREA OF A WINDOW-HAVING MAIL ITEM

BACKGROUND OF THE INVENTION

This invention relates to an arrangement for use in a mail sorting machine.

In general, use is made in a mail sorting machine of an installation for detecting a postal code number or a zone improvement program code described on each mail item, such as a postcard or a sealed letter. The detection is possible when other postal information pieces are scarce on the mail item except an addressee's name and address including the addressee's postal code number and when an information position of the postal code number is strictly defined on the mail item. An envelope for a sealed letter often has a window area through which the addressee's address described on the enclosed letter paper is visible. The window area is usually provided by a substantially transparent medium, such as a paraffin or cellophane film. On the window-having mail item, postal information pieces other than addressee's are often described or printed adjacent to and parallel with the window area. Accordingly, it is difficult to derive from the window-having mail item the postal information pieces described inside the window area alone or visible through the window area.

In U.S. Pat. No. 4,034,341, a device is proposed for preliminarily detecting information positions of the respective postal information pieces, deriving the postal code numbers of the addressee's addresses from the detected information positions, and sorting the mail items in accordance with the derived postal code numbers. It is difficult even with the proposed device to distinguish the postal information pieces described inside the window area from the remaining postal information pieces.

SUMMARY OF THE INVENTION

It is therefore an object of this invention to provide an arrangement to be used together with a device of the type described, which is capable of detecting information positions located inside a window area of a window-having mail item.

It is more specific object of this invention to provide an arrangement of the type described, which is capable of carrying out the detection when the window area substantially regularly reflects light incident thereon while a remaining area does not.

An arrangement to which this invention is applicable is used together with a device for detecting those information positions of mail items where postal information pieces are described, respectively. The mail items are successively fed along a predetermined path of a predetermined direction at a substantially predetermined speed, have leading edges, respectively, and include a mail item having a window area and a remaining area. The information positions of the window-having mail item are located at least inside the window area. The device comprises optical means for illuminating by light the successively fed mail items along a line predetermined relative to the path, means responsive to the leading edge of each of the successively fed mail items for determining a point on the leading edge to produce a point signal indicative of said point, and means responsive to the point signals produced in response to the leading edges and the light reflected from the successively fed mail items for detecting the information positions of the successively fed mail items relative to the predetermined points and the predetermined direction to produce information position signals indicative of the detected information positions. The arrangement according to this invention comprises first means to be coupled to the optical means and the point determining means and responsive to the light reflected from the window area for producing a window position signal indicative of a window position of the window area relative to the predetermined point of the window-having mail item and second means to be coupled to the information position detecting means and responsive to the window position signal and the information position signals for selecting the information position signals indicative of the information positions located inside the window area.

DESCRIPTION OF THE PREFERRED EMBODIMENTS

Figure 1:
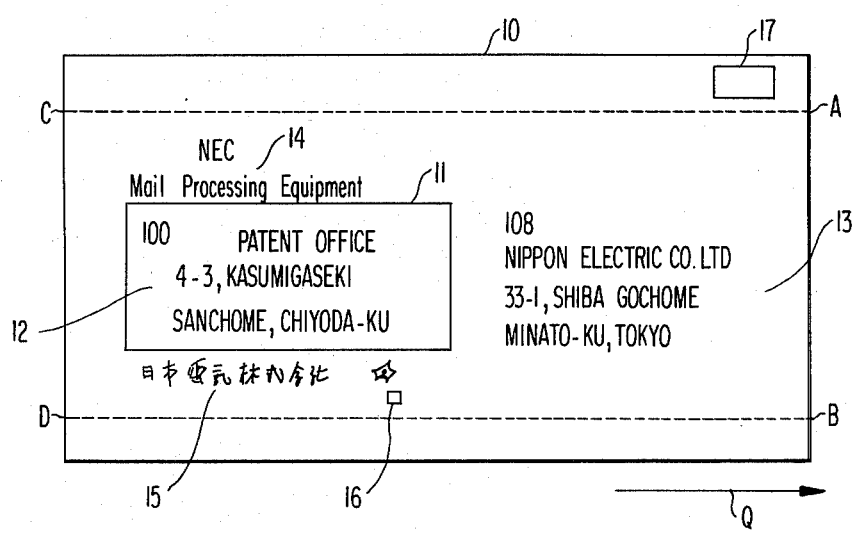
FIG. 1 exemplifies a mail item having a window area and a remaining area.

Referring to FIG. 1, a mail item 10 has a window area 11 and a remaining area. The window area 11 is provided by a substantially transparent film, such as a paraffin or a cellophane film. On the mail item 10, a representation is made of various postal information pieces including an addressee's name and address 12, a sender's name and address 13, a commercial message 14, a print 15 of the sender's name in a different manner, and an ornament or a symbol pattern 16. A stamp 17 is affixed to the mail item 10. The addressee's postal information pieces 12 including a postal code number is located inside the window area 11 to be read through the transparent film. A plurality of mail items including the mail item 10 are successively fed along a predetermined path as symbolized by an arrow Q. Therefore, each of the mail items has a leading edge on the right-hand side of the illustration and a trailing edge on the left-hand side. As will be described later, optical scanning is carried out all over a rectangular area defined by four corner points A, B, C, and D. Two of the points, namely, A and B, are present on the leading edge while the remaining points C and D, on the trailing edge. The points A and C are nearer to the top of the mail item 10 while the points B and D, nearer to the bottom. It should be noted that the window area 11 has a high reflection factor for regularly reflected light as compared with the remaining area and therefore that the window area 11 reflects light incident thereon both irregularly and approximately regularly. It is also to be noted that the light may not necessarily be visible light.

Figure 2:
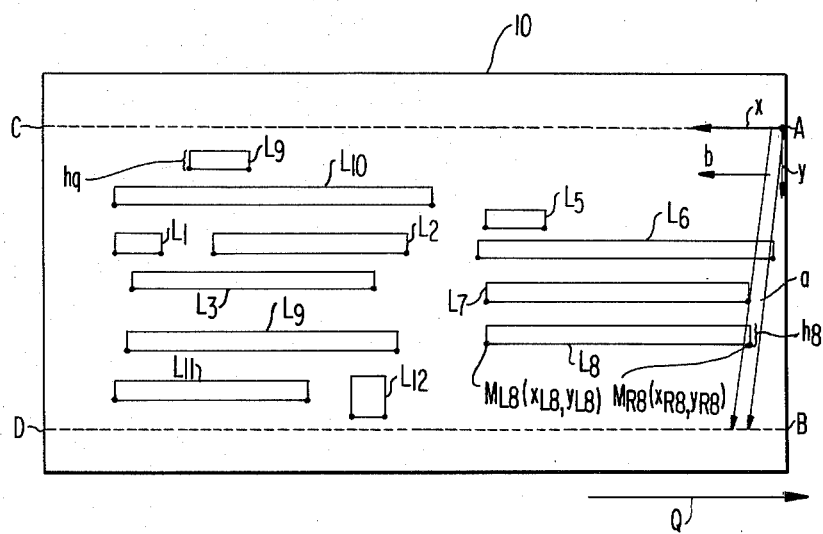
FIG. 2 shows segment patterns of postal information pieces described on the mail item illustrated in FIG. 1.

Referring to FIG. 2, a device disclosed in the above-referenced patent specification determines the point A as a predetermined point on the leading edge for use as an origin of a coordinate system. Merely for simplicity of description, it is surmised that the coordinate system is a rectangular x-y coordinate system having an x-axis in the sense opposite to the sense Q of transport of the mail items and a y-axis perpendicularly of the x-axis towards the bottom. Information positions of the postal information pieces 12 through 16 are equivalently defined by segment patterns $L_J$ ($J=1, 2, \ldots$, and 12). The patterns $L_1$ through $L_4$ are for the addressee's name and address 12 located inside the window area 11 while the patterns $L_5$ through $L_8$, for the sender's name and address 13 printed on the remaining area. The patterns $L_9$ and $L_{10}$ give the commercial message 14 while the patterns $L_{11}$ and $L_{12}$, the sender's name 15 and the ornament or symbol 16, respectively. The device comprises an optical scanner for illuminating by light the mail item 10 along a line predetermined relative to the predetermined path to intersect the direction Q. More particularly, the scanner optically scans the mail item 10, starting at the point A, towards the bottom in a first direction a. As the mail item 10 is fed, the optical scanning moves in a second direction b. Responsive to the light reflected from the mail item 10, the device detects the segment patterns $L_J$ by determining right bottom corner points $M_{RJ}$ ($x_{RJ}$, $y_{RJ}$), left bottom corner points $M_{LJ}$ ($x_{LJ}$, $y_{LJ}$), and heights $h_J$ of the respective patterns $L_J$.

Figure 3:
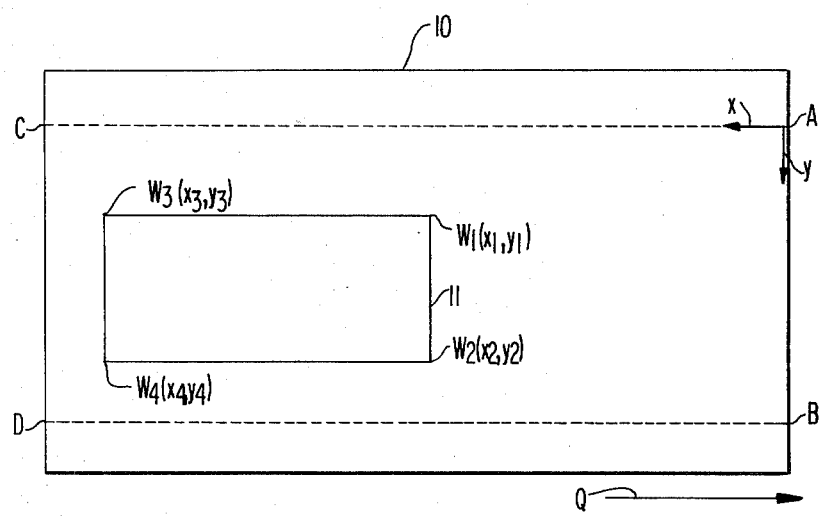
FIG. 3 shows a manner of defining a window position of the window area on the mail item depicted in FIG. 1.
Figure 4:
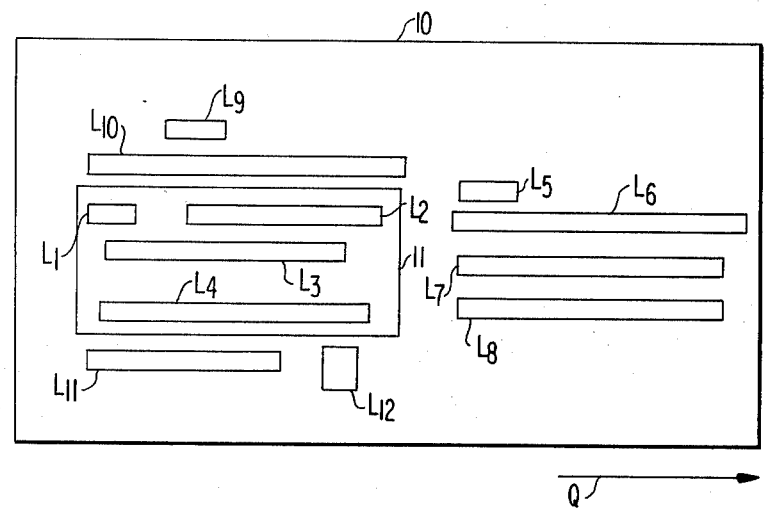
FIG. 4 is for illustrating the segment patterns located inside the window area and on the remaining area.

Turning to FIGS. 3 and 4, an arrangement according to this invention is for detecting those of the information positions of a window-having mail item 10 which are located inside the window area 11. To this end, the arrangement determines relative to the point A and the direction Q a window position of the window area 11. According to a preferred aspect of this invention, the determination is carried out by detecting with reference to the x-y coordinate system a right top corner point $W_1$ ($x_1$, $y_1$) of the window area 11, a right bottom corner point $W_2$ ($x_2$, $y_2$), a left top corner point $W_3$ ($x_3$, $y_3$), and a left bottom corner point $W_4$ ($x_4$, $y_4$). The corner points $W_1$ and $W_2$ are present on a front edge of the window area 11 while the remaining corner points $W_3$ and $W_4$, on a rear edge thereof. The segment patterns $L_1$ through $L_4$ located inside the window area 11 and defining the information positions for the addressee's postal information pieces 12 (FIG. 1) are selected by the use of the corner points $W_1$ through $W_4$ from the segment patterns $L_J$ determined by a device of the type disclosed in the above-cited patent specification.

Figure 5:
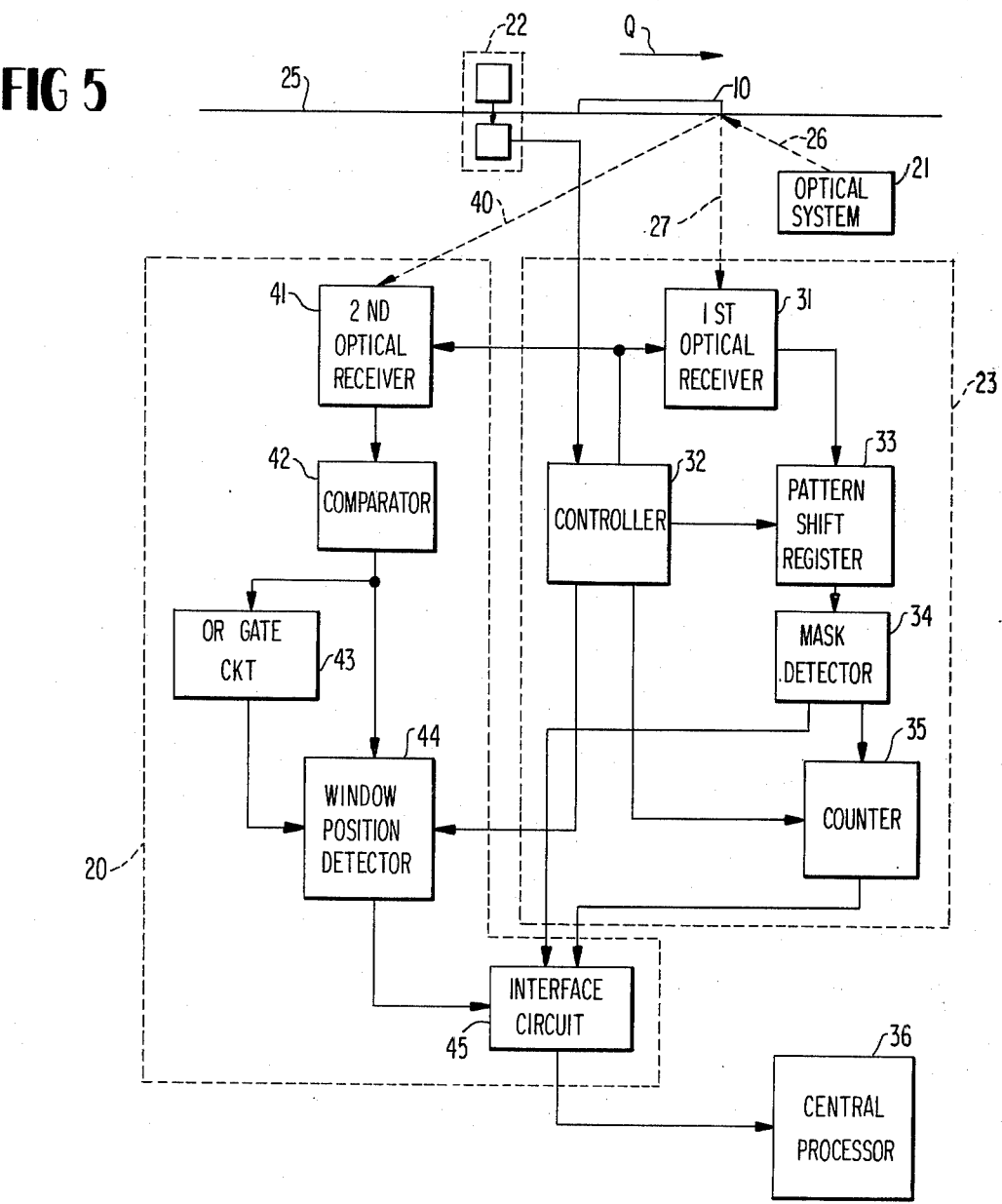
FIG. 5 shows in blocks an arrangement according to a preferred embodiment of this invention together with a conventional device for generally detecting the segment patterns.

Referring now to FIG. 5, an arrangement 20 according to a preferred embodiment of this invention is for use in combination with a device comprising an optical system 21, a point signal producing unit 22, and an information position detecting unit 23 as taught in the referenced specification. As described with reference to FIG. 1, mail items including a window-having mail item 10 are successively fed along a predetermined path 25 in a predetermined direction Q at a substantially predetermined speed. The optical system 21 illuminates the mail item 10 by a beam 26 of light along a line predetermined relative to the path 25 to preferably perpendicularly intersect the direction Q. Responsive to the leading edge, the point signal producing unit 22 produces a point signal indicative of the point A (FIGS. 1 through 3). The window area 11 and the remaining area irregularly reflect the light incident on the mail item 10 to provide a beam 27 of the reflected light. A first optical receiver 31 of the information position signal producing unit 23 is positioned adjacent to the predetermined line to receive the irregularly reflected light beam 27. Supplied with the point signal, a controller 32 of the unit 23 generates a starting pulse followed by a sequence of sampling pulses. Responsive to the starting and the sampling pulses, the first optical receiver 31 equivalently carries out optical scanning of rectangular area ABCD to successively produce quantized signals that two-dimensionally quantize the area ABCD by cooperation of the sampling pulses and the lines of optical scan and take logic "1" and "0" values according to the postal information pieces 12 through 16 (FIG. 1) described inside the window area 11 and on the remaining area. The controller 32 further produces a sequence of clock pulses, one pulse for each line of scan. Stepped by the sampling and clock pulses, a pattern shift register 33 of the unit 23 stores the quantized signals in two-dimensionally quantized patterns similar to the respective postal information pieces 12 through 16. Supplied with the quantized signals stored in the shift register 33, a mask detector 34 discriminates whether or not each quantized pattern has an area sufficient for a postal information piece to produce a first, a second, and a third signal corresponding as regards time to the right top end of the quantized pattern, the right bottom end, and the left bottom end, respectively. Responsive to the first and second signals, a counter 35 counts the sampling pulses to determine the heights $h_J$ of the respective segment patterns $L_1$ through $L_{12}$. Responsive also to the second and third signals, the counter 35 counts the clock and sampling pulses to determine the coordinates $x_{RJ}$, $y_{RJ}$, $x_{LJ}$, and $y_{LJ}$. The counter 35 thus produces information position signals representative of the determined coordinates and heights. The quantized signals of the mask detector 34 and the information position signals are supplied from the information position signal producing unit 23 to a central processor 36 for reading the postal information pieces 12 through 16.

Figure 6:
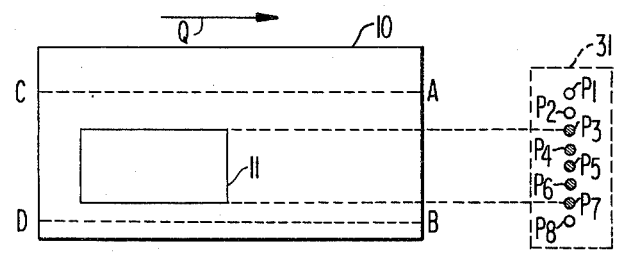
FIG. 6 schematically shows a row of photocells used in an arrangement according to this invention together with the mail item illustrated in FIG. 1.

Referring to FIG. 5 again and to FIG. 6 afresh, it is to be recalled that the window area 11 of a window-having mail item 10 is capable of approximately regularly reflecting the light beam 26 incident thereon to provide a beam 40 of the approximately regularly reflected light. The arrangement 20 comprises a second optical receiver 41 comprising, in turn, a row of photoelectric conversion elements P1 through P8, such as photocells or phototransistors, parallel to the predetermined line so as to receive the regularly reflected light beam 40. Supplied with the starting pulse, the second optical receiver 41 is put into operation. As a result, each of the photoelectric conversion elements produces a window detection signal in response to the regularly reflected light beam 40 and otherwise a spurious signal. It thus simultaneously occurs during passage of the window area 11 through the predetermined line that the photoelectric conversion elements P3 through P7 hatched in FIG. 6 produce the window detection signals while the remaining photoelectric conversion elements P1, P2, and P8 produce the spurious signals. As will readily be understood with reference to FIG. 6, two of the hatched photoelectric conversion elements P3 and P7 disposed nearest to both ends, respectively, of the row correspond to the width of the window area 11, namely, the dimension thereof perpendicular to the direction Q. The arrangement 20 further comprises a comparator 42 for comparing the signals supplied from the second optical receiver 41 with a threshold signal to simultaneously produce logic "1" and "0" signals in response to the window detection signals and the spurious signals, respectively. In other words, the comparator 42 produces output signals in response to the respective window detection signals alone. Responsive to the simultaneously produced logic "0" and/or "1" signals, an OR gate circuit 43 of the arrangement 20 produces a single logic "1" signal so long as the window area 11 travels through the predetermined line.

Supplied with the logic "0" and/or "1" signals from the comparator 42, a window position detector 44 determines the width of the window area 11 to produce a width signal representative of the determined width. Responsive to the single logic "1" signal and the starting and clock pulses, the detector 44 determines a first interval between a first instant of production of the starting pulse that is followed by the comparator output signals and a second instant of appearance of the single logic "1" signal to produce an interval signal representative of the first interval or the abscissae of the right top and bottom corner points $W_1$ and $W_2$ of the window area 11. Also, the detector 44 determines a second interval between the second instant and a third instant of disappearance of the single logic "1" signal to produce a rear edge signal representative of the abscissae of the left top and bottom corner points $W_3$ and $W_4$. It will be readily understood that the interval signal and the rear edge signal cooperate to provide a length signal representative of the length of the window area 11, namely, the distance between the front edge and the rear edge. The width, interval, and length signals provide a window position signal. With reference to the signals supplied from the mask detector 34 and the window position detector 44, an interface circuit 45 of the arrangement 20 selects the information position signals for the segment patterns $L_1$ through $L_4$ from all the information position signals supplied from the counter 35 to supply the selected information position signals to the central processor 36 to make the latter read the postal information pieces 12 described inside the window area 11. Preferably, the interface circuit 45 carries out the selection by picking up the information positions of the segment patterns $L_4$ through $L_{12}$ from all the information positions and cencelling the picked up information positions from the latter information positions to leave the information positions for the segment patterns $L_1$ through $L_4$. It is possible to resort the software for the central processor 36 rather than to the interface circuit 45.

Figure 7:
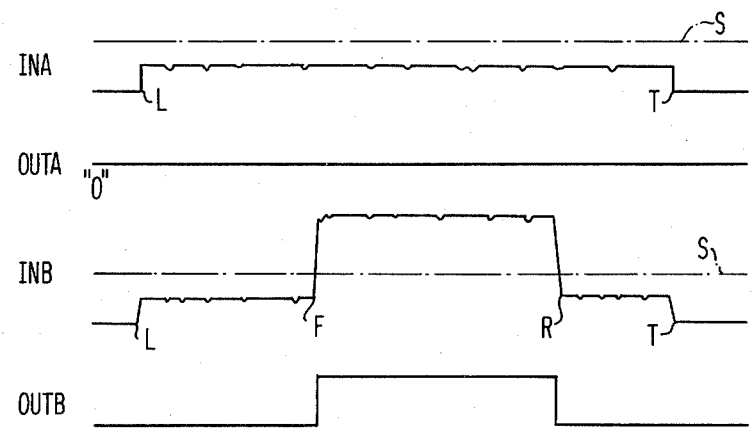
FIG. 7 shows a few signals appearing in the arrangement according to the preferred embodiment.

Referring to FIG. 7, a first input signal INA depicted at the top together with a threshold level S of the threshold signal is the signal supplied to the comparator 42 from each of the unhatched photoelectric conversion elements P1, P2, and P8 (FIG. 6). The input signal INA rises not to reach the threshold level S at an instant L when the leading edge of the mail item 10 passes through the predetermined line. The input signal INA falls at another instant when the trailing edge passes through the line. In response to the input signal INA, the comparator 42 produces a logic "0" signal OUTA as shown along the second line. A second input signal INB illustrated along the third line together with the threshold level S is the signal supplied to the comparator 42 from each of the hatched photoelectric conversion elements P3 through P7. The signal INB rises above the threshold level S at an instant F of passage through the line of the front edge of the window area 11 and falls below the level S at another instant R of passage through the line of the rear edge. A comparator output signal OUTB takes a logic "1" value during passage through the line of the window area 11.

Figure 8:
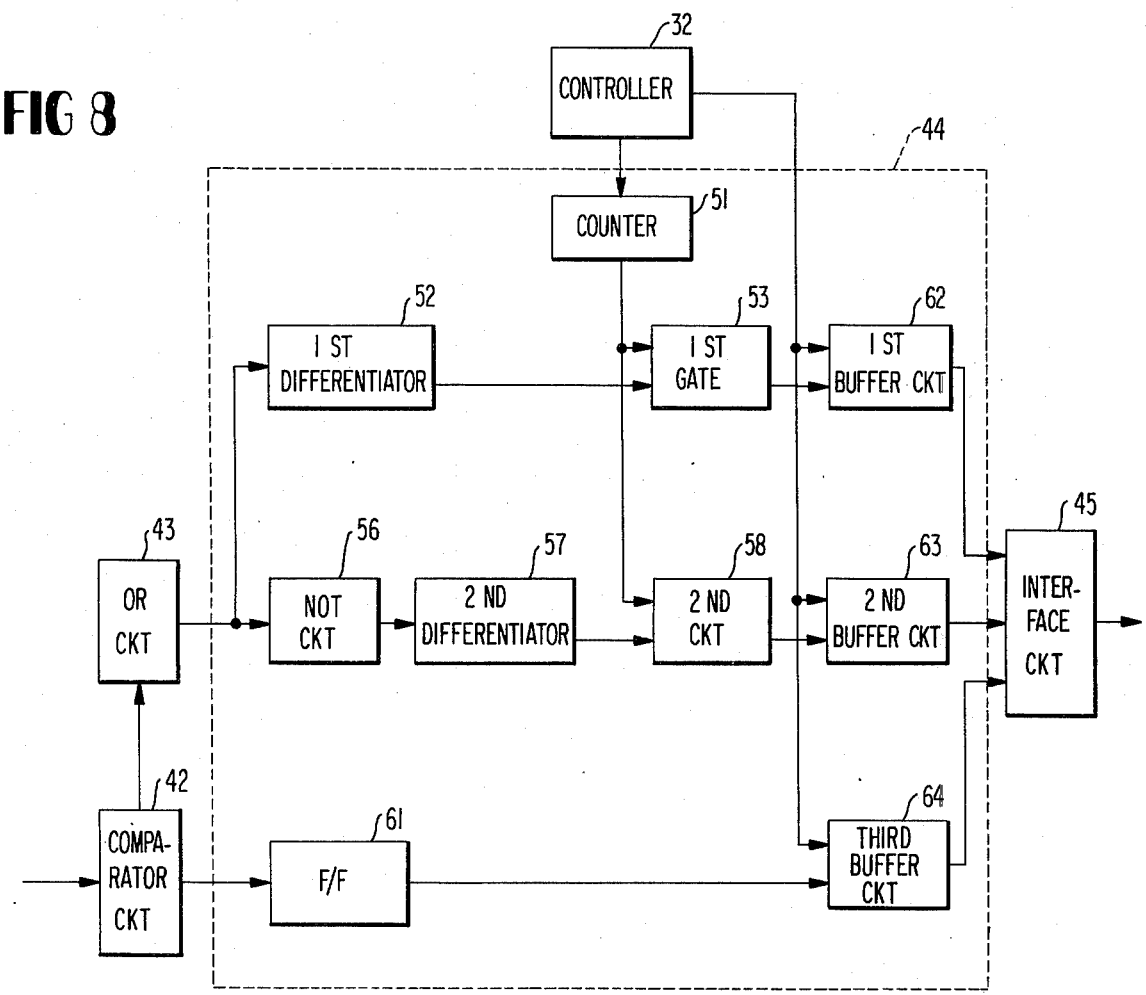
FIG. 8 is a block diagram of a window position detecting unit preferably used in the arrangement according to this invention.

Referring to FIG. 8, a preferred window position detector 44 comprises a first circuit section responsive to the single logic "1" signal and the starting and clock pulses for producing the interval signal. The circuit section comprises a counter 51 reset by the starting pulse to count the clock pulses and to produce a count signal representative of the count of the clock pulses, a first differentiator 52 for differentiating the single output signal supplied from the OR gate circuit 43 to produce a first pulse at the second instant, and a first gate circuit 53 connected to the counter 51 and enabled by the first pulse to allow passage therethrough of the count signal representative of the count for the first interval. A second circuit section is connected to the first circuit section to produce the length in response to the single logic "1" signal. The second circuit section comprises a NOT circuit 56 for inversing the single logic "1" signal, a second differentiator 57 for differentiating the inversed logic "1" signal to produce a second pulse at the third instant, and a second gate circuit 58 connected to the counter 51 and enabled by the second pulse to allow passage therethrough of the count signal representative of the count for a sum of the first and second intervals. A third circuit section comprises a plurality of flip-flop circuits depicted by a single block 61 in correspondence to the respective photoelectric conversion elements P1 through P8 (FIG. 6). The flip-flop circuits 61 are set by the logic "1" signals supplied from the comparator 42 to cooperate in producing the width signal. It is to be noted here that the controller 32 produces an end pulse when the trailing edge of the mail item 10 passes through the predetermined line. The preferred window position detector 44 further comprises three buffer circuits 62, 63, and 64 supplied with the end pulse and connected to the first through third circuit sections, respectively. The interval, length, and width signals are stored in the buffer circuits 62 through 64 and produced as the window position signal in response to the end pulse.

With reference to FIGS. 1 and others, the window area 11 has been presumed to be rectangular. For a window area of an elliptic shape or the like, the preferred window position detector 44 produces a length signal representative of a distance between a point nearest on the periphery of the window area to the leading edge and another point nearest to the trailing edge and a width signal representative of another distance between a third point nearest on the periphery to the top edge of the mail item and a fourth point nearest to the bottom. The window position detector 44 may be a circuit similar to the counter 35 of the information position detecting unit 23 for producing signals representative of the coordinates $(x_1, y_1)$, $(x_2, y_2)$, $(x_3, y_3)$, and $(x_4, y_4)$ of the corner points $W_1$ through $W_4$ of the rectangular window area 11 in response to signals supplied from the controller 32, the mask detector 34, the OR gate circuit 43, and the comparator 42.

While this invention has thus far been described in conjunction with preferred embodiments thereof, it is now readily possible to modify the embodiments in various manners. For example, the flip-flops 61 of the arrangement 20 may be reset either by the starting or the end pulse. The arrangement 20 may comprise a separate controller responsive to the point signal for producing a separate starting pulse at an instant different from the instant of production by the illustrated controller 32 of the above-mentioned starting pulse, a sequence of the clock pulses following the separate starting pulse, and the end pulse. When use is made of the preferred window position detector illustrated with reference to FIG. 8, the separate controller need not produce the sampling pulses. With the separate controller used, the illustrated controller 32 need not produce the end pulse. Use is possible of the end pulse for resetting the counter 35 of the arrangement 20. The second optical receiver 41 may comprise a row of photoelectric conversion elements as exemplified in FIG. 6 with the elements supplied with the sampling pulses to equivalently carry out optical scanning of the predetermined line. In this event, the comparator 43 may compare the sequentially produced window detection and/or spurious signals, one at a time, with the threshold signal to successively produce the logic "0" and/or "1" signals. It is, however, necessary under the circumstances to interpose between the receiver 41 and the OR gate circuit 43 a memory circuit (not shown) for memorizing the window detection and/or spurious signals sequentially produced for each of the scanning lines.

What is claimed is:

1. An arrangement for use together with a device for detecting those information positions of mail items where postal information pieces are described, respectively, said mail items being successively fed along a predetermined path of a predetermined direction at a substantially predetermined speed, having leading edges, respectively, and including a mail item having a window area and a remaining area, the information positions of the window-having mail item being located at least inside said window area, said device comprising optical means for illuminating by light the successively fed mail items along a line predetermined relative to said path to intersect said path, said window area reflecting the light irregularly and approximately regularly, said remaining area and the mail items having no window area reflecting the light irregularly, said device further comprising means responsive to the leading edge of each of said successively fed mail items for determining a point on said leading edge to produce a point signal indicative of said point, and means responsive to the point signals produced in response to said leading edges and the light irregularly reflected from said successively fed mail items for detecting the information positions of said successively fed mail items relative to the predetermined points and said predetermined direction to produce information position signals indicative of the detected information positions, said arrangement comprising:

first means to be coupled to said optical means and said point determining means and responsive to the light approximately regularly reflected from said window area for producing a window position signal indicative of a window position of said window area relative to the predetermined point on the leading edge of said window-having mail item and said predetermined direction; and second means to be coupled to said information position detecting means and responsive to said window position signal and said information position signals for selecting the information position signals indicative of the information positions located inside said window area.

2. An arrangement as claimed in claim 1, said window area having a length in the direction of said path and a width transversely of said direction, wherein said first means comprises:

a row of photoelectric conversion elements to be disposed parallel to said line, each producing a window detection signal in response to the light approximately regularly reflected from said window area and otherwise a spurious signal;

means connected to said photoelectric conversion elements for producing output signals in response to the respective window detection signals alone;

first circuit means connected to said output signal producing means and to be connected to said point determining means for determining a first interval between a first instant of production of one of said point signals that is followed by said output signals and a second instant of appearance of at least one of said output signals to produce an interval signal representative of said first interval;

second circuit means connected to said first circuit means and said output signal producing means for determining a second interval between said second instant and a third instant of disappearance of all of said output signals to produce a length signal representative of said length;

third circuit means connected to said output signal producing means for determining two of said photoelectric conversion elements from which the window detection signals are produced and which are disposed nearest to both ends, respectively, of said row to produce a width signal representative of said width; and buffer means connected to said first through third circuit means for producing said window position signal with reference to said interval, length, and width signals at a predetermined instant following said third instant.

3. An arrangement as claimed in claim 2, wherein said first circuit means comprises:

a counter to be connected to said point determining means and responsive to each of said point signals for producing a count signal representative of a lapse of time from an instant of production of said each point signal; and a first gate circuit enabled in response to appearance of said at least one output signal to allow passage therethrough at said second instant of the count signal as said interval signal;

said second circuit means comprising a second gate circuit connected to said counter and enabled in response to disappearance of all of said output signals to allow passage therethrough at said third instant of the count signal as said length signal;

said third circuit means comprising a plurality of flip-flop circuits connected to said output signal producing means in correspondence to the respective photoelectric conversion elements, those of said flip-flop circuits being set to cooperate in producing said width signals which correspond to the photoelectric conversion elements said window detection signals are produced from.

4. An arrangement as claimed in claim 1, at least one of the information positions of said window-having mail item being located in said remaining area, wherein said second means comprises:

means connected to said first means and to be connected to said information position detecting means for selecting with reference to said window position signal the information position signal indicative of said at least one information position from the information position signals indicative of the information positions of said window-having mail item; and means responsive to the selected information position signal and the last-mentioned information position signals for cancelling said selected information position signal from the last-mentioned information position signals, thereby selecting the information position signals indicative of the information positions located inside said window area.

* * * * *

UNITED STATES PATENT AND TRADEMARK OFFICE
CERTIFICATE OF CORRECTION

PATENT NO. : 4,158,835
DATED : June 19, 1979
INVENTOR(S) : Tetsuo MIURA et al

It is certified that error appears in the above-identified patent and that said Letters Patent are hereby corrected as shown below:

Column 6, line 21 - after "length" insert -- signal --

Signed and Sealed this

Twentieth Day of November 1979

[SEAL]

Attest:

RUTH C. MASON
Attesting Officer

LUTRELLE F. PARKER
Acting Commissioner of Patents and Trademarks